United States Patent
Ng et al.

(10) Patent No.: US 8,064,430 B2
(45) Date of Patent: Nov. 22, 2011

(54) NETWORK ELEMENT APPARATUS AND INTERMEDIATE ROUTER APPARATUS

(75) Inventors: Chan-Wah Ng, Singapore (SG); Pek-Yew Tan, Singapore (SG); Toyoki Ue, Yokohama (JP)

(73) Assignee: Panasonic Corporation, Osaka (JP)

( * ) Notice: Subject to any disclaimer, the term of this patent is extended or adjusted under 35 U.S.C. 154(b) by 201 days.

(21) Appl. No.: 12/368,860

(22) Filed: Feb. 10, 2009

(65) Prior Publication Data

US 2009/0147789 A1 Jun. 11, 2009

Related U.S. Application Data

(63) Continuation of application No. 10/531,206, filed on Apr. 14, 2005, now Pat. No. 7,508,828.

(30) Foreign Application Priority Data

Oct. 18, 2002 (JP) .................................. 2002-303879

(51) Int. Cl.
   *H04L 12/28* (2006.01)
(52) U.S. Cl. ........................................ 370/351; 370/338
(58) Field of Classification Search ......................... None
   See application file for complete search history.

(56) References Cited

U.S. PATENT DOCUMENTS

| | | | |
|---|---|---|---|
| 5,166,674 A | 11/1992 | Baum | |
| 5,799,012 A | 8/1998 | Ayerst | |
| 6,208,644 B1 | 3/2001 | Pannell | |
| 6,496,505 B2 | 12/2002 | La Porta | |
| 6,578,085 B1 * | 6/2003 | Khalil et al. | 709/241 |
| 6,771,609 B1 | 8/2004 | Gudat | |
| 6,856,624 B2 * | 2/2005 | Magret | 370/392 |
| 6,912,232 B1 * | 6/2005 | Duffield et al. | 370/468 |
| 6,925,087 B2 | 8/2005 | Inoue | |
| 6,987,771 B2 * | 1/2006 | Shimizu et al. | 370/401 |
| 7,035,940 B2 * | 4/2006 | Sahasrabudhe et al. | 709/242 |
| 7,130,290 B2 | 10/2006 | Wada | |
| 7,130,614 B2 * | 10/2006 | Sreemanthula et al. | 455/411 |
| 7,136,365 B2 * | 11/2006 | Nakatsugawa et al. | 370/331 |
| 7,333,482 B2 * | 2/2008 | Johansson et al. | 370/353 |
| 7,483,697 B2 * | 1/2009 | Ohki | 455/432.1 |
| 2001/0012777 A1 * | 8/2001 | Igarashi et al. | 455/435 |

(Continued)

FOREIGN PATENT DOCUMENTS

JP  9172451  6/1997

(Continued)

OTHER PUBLICATIONS

PCT International Search Report dated Dec. 24, 2003.

(Continued)

*Primary Examiner* — Phirin Sam
(74) *Attorney, Agent, or Firm* — Dickinson Wright PLLC

(57) ABSTRACT

As an apparatus itself moves, its access section gets access to a router using a temporarily assigned global address when making a roaming connection to a different network from a network to which the apparatus belongs currently. A message generating section generates a binding update message, which contains a global address which is uniquely assigned to a network element apparatus, the above temporarily assigned global address, and a global address of the router, to transmit the generated message via the access section to a router, which is a serving router after move. This makes it possible to deliver packets among moving networks with the minimum delay to an intended recipient.

8 Claims, 8 Drawing Sheets

U.S. PATENT DOCUMENTS

| | | | |
|---|---|---|---|
| 2002/0186679 A1* | 12/2002 | Nakatsugawa et al. | 370/349 |
| 2003/0161287 A1 | 8/2003 | Venkitaraman | |
| 2004/0057440 A1 | 3/2004 | Thubert | |
| 2006/0109829 A1* | 5/2006 | O'Neill | 370/338 |
| 2009/0268672 A1* | 10/2009 | Kline et al. | 370/328 |

FOREIGN PATENT DOCUMENTS

| | | |
|---|---|---|
| JP | 2002 319966 | 10/2002 |
| JP | 2003 60683 | 2/2003 |

OTHER PUBLICATIONS

M. Isomura, et al.; "Network no Idosei o Jitsugen suru Mobile Router to Sono Tame no Keiro Seigyo Hoshiki no Teian," The Institute of Electronics, Information and Communication Engineers Gijutsu Kenkyu Hokoku, IN2002-10, May 10, 2002.

I. Okajima, et al.; "Ido Suru Network o Support suru Tame no Mobile IPv6 no Kakucho," The Institute of Electronics, Information and Communication Engineers Gijutsu Kenkyu Hokoku, IN2001-15, May 11, 2001.

F. Teraoka; "Ido Toka na Tsushin o Jitsugen suru Protocol," The Journal of the Institute of Electronics, Information and Communication Engineers, Apr. 25, 1997, vol. 80, No. 4, pp. 344-349.

T. Ernst, et al., "Network Mobility Support Requirements," Internet Draft: draft-ernst-monet-requirements-00.txt, Work in Progress, pp. 1-17, Feb. 2002.

C. E. Perkins, et al., "IP Mobility Support," IETF RCF 2002, IBM, pp. 1-79, Oct. 1996.

D. B. Johnson, et al., "Mobility Support in IPv6," Internet Draft: draft-ietf-mobileip-lpv618.txt, Work in Progress, 1 page total, Feb. 2003.

W. Simpson, "IP-in-IP Tunneling," IETF RFC 1853, pp. 1-8, Oct, 1995.

A. Conta, et al., "Generic Packet Tunneling in IPv6," IETF RFC 2473, pp. 1-36, Dec. 1998.

T. Narten, et al., "Neighbour Discovery for IP Version 6 (IPv6)," IETF RFC 2461, pp. 1-93, Dec. 1998.

T. Kniventon, et al., "Mobile RouterTunneling Protocol," Internet Draft: draft-kniventon-mobrtr-03.txt, Work in Progress, pp. 1-17, Nov. 2002.

A. Petrescu, et al., "Issues in Designing Mobile IPv6 Network Mobility with the MR-HA Bidirectional Tunnel(MRHA)," Internet-Draft: draft-petrescu-nemo-mrha-00.txt, Work in Progress, pp. 1-27, Nov. 2002.

H. Soliman, et al. "Mobile Networks (MONET) Problem Statement and Scope," Internet Draft: draft-soliman-monet-statement-00.txt, Work in Progress, Feb. 2002, pp. 1-6.

H. Lach, et al, "Mobile Networks Scenarios, Scope and Requirements," Internet Draft: draft-lach-monet-requirements-00.txt, Work in Progress, Feb. 2002, pp. 1-5.

T. Kniveton, et al. "Problem Scope and Requirements for Mobile Networks Working Group," Internet Draft: draft-kniveton-monet-requirements-00.txt, Mobile Networks BOF, Work in Progress, Feb. 2002, pp. 1-9.

DARPA Internet Protocol Specification, "Internet Protocol," Information Sciences Institute, University of Southern California, IETF RFC 791, Sep. 1981, pp. 1-45.

S. Deering, et al. "Internet Protocol, Version 6(IPv6) Specification," Network Working Group, IETF RFC 2460, Dec. 1998, pp. 1-39.

T. Kniveton, et al. "Mobile Router Support with Mobile IP," Mobile IP Working Group, Internet Draft: draft-kniveton-mobrtr-01.txt, Work in Progress, Feb. 2002, pp. 1-13.

P. Thubert, et al. "IPv6 Reverse Routing Header and Its Application to Mobile Networks," Network Working Group, Internet Draft: draft-thubert-nemo-reverse-routing-header-00.txt, Work in Progress, Jun. 19, 2002, pp. 1-37.

T. Ernst, et al. "Mobile Networks Support in Mobile IPv6 (Prefix Scope Binding Updates)," Internet Draft: draft-ernst-mobileip-v6-network-03.txt, Mar. 2002, pp. 1-22.

T. Ernst, et al. "Network Mobility Support Terminology," IETF Internet Draft: draft-ernst-nemo-requirements-00.txt, Oct. 2002, pp. 1-17.

Hyunsik Kang et al., "Route Optimization for Mobile Network by Using Bi-directional Between Home Agent and Top Level Mobile Router; draft-hkang-nemo-ro-tlmr-00.txt," IETF Standard-Working-Draft, Internet Engineering Task Force, IETF, CH, Jun. 1, 2003, pp. 1-9.

Ernst Thierry, "Network Mobility Support in IPv6," Thesis Department of Mathematics and Computer Science, Oct. 29, 2001, pp. 1-99.

* cited by examiner

NETWORK ELEMENT APPARATUS AND INTERMEDIATE ROUTER APPARATUS

This is a continuation of application Ser. No. 10/531,206 filed Apr. 14, 2005, which is a U.S. national stage of PCT/JP2003/013348 filed Oct. 20, 2003, which is based on Japanese application number 2002-303879 filed on Oct. 18, 2002, the entire contents of each of which are expressly incorporated by reference herein.

FIELD OF THE INVENTION

The present invention relates to packet transmission in internetworking of packet-switched data communications network.

BACKGROUND ART

Today's Internet has evolved to a stage where a lot of data communications networks surround on the periphery of the system of fixed network nodes, forming a global network. These peripheral networks are properly known as edge networks, whereas the system of fixed network nodes surrounded with the edge networks is known as "core." With the emergence and enhancement of wireless technologies, these edge networks are more and more popularly used for wireless solutions, forming a special edge network called as a mobile network, or a network in motion (refer to Non-Patent Document 1, 2, 3, and 4).

FIG. 1 is a diagram illustrating one example of a global network described above. On the periphery of a system (IP cloud) comprising CN (Corresponding Node), AR1 (Access Router 1), AR2, and HA1 (Home Agent 1) which constitute fixed network nodes, there are a home network for MN0 (Mobile Node 0), which is an edge network, and mobile networks (the home network and a foreign network of MR1) developed around it.

Essentially, a mobile network is a type of network in which the network as a whole changes its point of attachment to the Internet, and which normally necessitates a mobile router (a router which connects a mobile network to the Internet: denoted as MR1 in the figure) in the mobile network which changes its point of attachment to the Internet between different access routers AR1 and AR2 (practically, such access router themselves may be mobile). Examples of a mobile network include a network connected to general public (known as a Personal Area Network or PAN), or a sensor network deployed in a vehicle such as an automobile, train, vessel, and aircraft. In a mass-transport system such as an aircraft, train, bus, and so on, it is possible for an administrator to provide fixed vehicle-mounted Internet access capabilities to passengers, making them further possible to enjoy the use of a laptop, Personal Digital Assistant (PDA), or a car phone for accessing to a remote host. Each individual node in such a mobile network (MN0 in FIG. 1) is normally connected to a central apparatus (i.e. mobile router MR1), and does not change its point of attachment when its network is in motion; instead the mobile router MR1 changes its point of attachment in such a case so that the network as a whole moves.

The present invention describes a solution proposed to address the problem of a network in motion. Essentially, the issue of a network in motion lies in providing continuous Internet connectivity for nodes in a network which is mobile as a whole. The node MN0 in a mobile network might not be aware that the network is changing its point of attachment to the Internet; in this point, it differs from the classical issue of mobility support which is dealt with in mobile IPv4 (Non-Patent Document 5) of Internet Protocol Version 4 (IPv4; Non-Patent Document 6) and mobile IPv6 (Non-Patent Document 7) of Internet Protocol Version 6 (IPv6; Non-Patent Document 8). In Non-Patent Documents 5 and 7, it is mainly aimed to provide mobility support for individual hosts rather than for a network as a whole.

In Mobile IP, each mobile node has a permanent home domain. When the mobile node is attached to its home network, a permanent global address known as a home-address is assigned to the mobile node. When the mobile node is away, i.e. attached to some other foreign networks, a temporary global address known as a care-of-address is usually assigned to the mobile node. The idea of mobility support is such that the mobile node can be reached at the home-address even when it is attached to other foreign networks. This is achieved in the Non-Patent Documents 5 and 7 with the introduction of a home network entity known as a home agent. Mobile nodes register their care-of-addresses with the home agents using messages known as Binding Updates. The home agent is responsible to intercept messages that are addressed to the mobile node's home-address, and forward the packet to the mobile node's care-of-address using IP-in-IP Tunneling (Non-Patent Documents 9 and 10). IP-in-IP tunneling involves encapsulating an original IP packet in another IP packet. The original packet is sometimes called as an inner packet, whereas a new packet which encapsulates the inner packet is sometimes called as an outer packet.

Extending the idea of mobility support for individual hosts to mobility support for a node network, the objective of the solution for a network in motion is to provide a mechanism which allows nodes in a mobile network to be reached by accessing their permanent addresses regardless of wherever on the Internet the mobile network is attached. There have been several major attempts for solving the problem of a network in motion, all of which are based on mobile IP (Non-Patent Document 5, 7).

One of the solutions proposed for a network in motion is mobile router support (Non-Patent Document 11). Therein, in a case where a mobile router which manages a mobile network is located in its home domain, the mobile router performs the routing of packets from/to the mobile network by using several routing protocols, whereas in a case where the mobile router and the mobile network move to a foreign domain, the mobile router registers a care-of-address with its home agent, and thereafter, an IP-in-IP tunneling is set between the mobile router and the home agent. The routing protocols which are used when the mobile router is located in its home domain are also executed on the IP-in-IP tunneling again. This means that all packets bound for the mobile network are intercepted by the home agent, and then forwarded to the mobile router through the IP-in-IP tunneling. The mobile router then forwards the packets to hosts in the mobile network. In a case that a node in the mobile network wishes to send packets to the outside of the network, the mobile router intercepts the packets to forward them to the home agent through the IP-in-IP tunneling, and subsequently the home agent forwards the packets to an intended recipient.

Another solution proposed in Non-Patent Document 12 is an enhancement of mobile router support (Non-Patent Document 11). The solution contains the use of a Reverse Routing Header in order to avoid encapsulation in too many levels in a case where a mobile network is made in nesting (that is, a mobile network is connected to another mobile network). Here, a mobile network of the lowest level sets a Reverse Routing Header to its home agent inside a tunnel packet. Upon interception of the tunnel packet on its way by a mobile router of a higher level, the mobile router of the higher level skips encapsulation of this packet into another IP-in-IP tunneling; and instead the mobile router of the higher level copies a source address in the packet to the Reverse Routing Header, and places its own care-of-address as the source address. In this way, in a case where a home agent of the first mobile router receives packets, the home agent is able to determine the chain of mobile routers lying on a path between the first mobile router and the home agent itself. Subsequently, in a case where the home agent wishes to forward another intercepted packet to the first mobile router, it is possible to contain a Routing Header (Non-Patent Document 8) in the forwarded packet so that the packet is directly sent to the first mobile router by way of the mobile router of the higher level.

The third solution for the problem of a network in motion is proposed by Non-Patent Document 13, which is known as Prefix Scope Binding Update. Therein, a proposal for solutions is made which adds information related to a mobile network prefix to a Binding Update sent by a mobile router. By doing that way, a home agent is able to guess that nodes having a prefix which matches with one identified by the Binding Update are connected to the mobile router, and accordingly, the home agent is able to forward packets bound for such nodes to the mobile router.

In Non-Patent Document 11, the use of an IP-in-IP tunneling causes a detrimental effect known as route triangulation. This detrimental effect is caused in a situation where a packet from a certain node to another node needs to pass through a third party (a home agent in this case) which is not located on its optimal route between a start point (source) to an end point (destination), and the effect of route triangulation should be contained therein in a case where the mobile network is made in nesting. For example, a packet from a mobile network which must be forwarded through three mobile routers is considered. Using the solution proposed by the Non-Patent Document 11, the packet needs to be encapsulated in three different tunnels. Herein, each tunnel is destined for a different home agent for a different mobile router. A number of these tunneling not only causes a significant delay in packet delivery, but also increases the chance of packet fragmentation on its way because the entire packet size is increased due to encapsulation. Re-assembly of such packets subjected to fragmentation results in further delay in processing, and the packet as a whole must be discarded in a case where even one piece among the fragments is lost.

The solution proposed by Non-Patent Document 12 attempts to overcome the problem by avoiding a lot of tunnels. In this solution, it is enough if the first mobile router sets an IP-in-IP tunnel with its home agent. Subsequent mobile routers do not perform further encapsulation of the packet; and instead these routers record a Reverse Routing Header in an original source address, change the source address with their care-of-address, and forward the packet to its destination without passing through their home agent. Though this solution is highly effective and solves many tunnel problems, it is very difficult for the home agent to verify the reliability of an address list recorded in the Reverse Routing Header. According to Non-Patent Document 12, as a Routing Header is constructed for whichever packet it is to forward it to the mobile router directly, and so a home agent using the list of addresses in the Reverse Routing Header is required, and therefore, it is critically important for the home agent to be able to verify that the address recorded in the Reverse Routing Header is an authentic one. The solution of the Non-Patent document 12 provides no improvements against a threat to a safety security which the Reverse Routing Header must face with.

Another simple solution for overcoming the problem of a lot of tunneling is to make it possible for mobile routers of later location to forward outer packets directly to a specified destination (further instead of performing encapsulation of outer packets at the level of tunneling to the home agent for the mobile routers). However, even with this solution, it is not possible for a recipient to verify that the outermost packet has come from an authentic source, and therefore it must face with the same security problem.

It is noted that, in this specification, the document referred to as Non-Patent Document 1 is Soliman, H., and Pettersson, M., "Mobile Networks (MONET) Problem Statement and Scope", Internet Draft, draft-soliman-monet-statement-00.txt, February 2002, Work In Progress; the document referred to as Non-Patent Document 2 is Ernst, T., and Lach, H., "Network Mobility Support Requirements", Internet Draft: draft-ernst-monet-requirements-00.txt, February 2002, Work In Progress; the document referred to as Non-Patent Document 3 is Lach, H. et. al., "Mobile Networks Scenarios, Scope and Requirements", Internet Draft: draft-lach-monet-requirements-00.txt, February 2002, Work In Progress; the document referred to as Non-Patent Document 4 is Kniventon, T. J., and Yegin, A. E., "Problem Scope and Requirements for Mobile Networks Working Group", Internet Draft: draft-kniventon-monet-requiremetns-00.txt, February 2002, Work In Progress; the document referred to as Non-Patent Document 5 is Perkins, C. E. et al., "IP Mobility Support", IETF RCF 2002, October 1996; the document referred to as Non-Patent Document 6 is DARPA, "Internet Protocol", IETF REC 791, September 1981; the document referred to as Non-Patent Document 7 is Johnson D. B., Perkins C. E., and Arkko, J., "Mobility Support in IPv6", Internet Draft: draft-ietf-mobileip-ipv6-18.txt, Work In Progress, June 2002; the document referred to as Non-Patent Document 8 is Deering, S., and Hinden, R., "Internet Protocol Version 6 (IPv6) Specification", IETF RFC 2460, December 1998; the document referred to as Non-Patent Document 9 is Simpson, W., "IP-in-IP tunneling", IETF RFC 1853, October 1995; the document referred to as Non-Patent Document 10 is Conta, A., and Deering, S., "Generic Packet Tunneling in IPv6", IETF RFC 2473, December 1998; the document referred to as Non-Patent Document 11 is Kniveton, T., "Mobile Router Support with Mobile IP", Internet Draft: draft-kniveton-mobrtr-01.txt, Work In Progress, March 2002; the document referred to as Non-Patent Document 12 is Thubert, P., and Molteni, M., "IPv6 Reverse Routing Header and Its Application to Mobile Networks", Internet Draft: draft-thubert-nemo-reverse-routing header-00.txt, Work In Progress, June 2002; the document referred to as Non-Patent Document 13 is Ernst, T., Castelluccia, C., Bellier, L., Lach, H., and Olivereau, A., "Mobile Networks Support in Mobile IPv6 (Prefix Scope Binding Updates)", Internet Draft: draft-ernst-mobileip-v6-network-03.txt, March 2002; and the document referred to as Non-Patent Document 14 is Narten, T., Nordmark, E., and Simpson, W., "Neighbour Discovery for IPv6", IETF RFC 2461, December 1998.

DISCLOSURE OF THE INVENTION

To solve the problems mentioned under the section of BACKGROUND ART, according to the present invention, a mobile network element employs a mechanism for passing information related to an access router to which a mobile node is attached on to its home agent or other corresponding nodes.

Utilizing this information, without inviting a penalty which is applied in route triangulation, a home agent or corresponding nodes are able to construct a routing header which is for sending packets directly to a mobile node. The information related to the router to which the mobile node is attached is sent by the mobile node itself, and accordingly, the reliability of the information is inevitably established.

Furthermore, because the home agent or other corresponding nodes have received the information related to the router to which the mobile node is attached, it is possible to verify that a packet arriving through a tunnel with one outer source address of access routers is from an authentic source. Therefore, because it is possible for a recipient to verify the reliability of a forwarding router, it is possible for a mobile router to forward an outer packet directly to a specified destination.

The present invention encompasses the internetworking of packet-switched data networks. Some networks among these networks are in motion; for example, a router controlling an inner network side interface of the network changes its point of attachment. The present invention provides enhancements to existing solutions in order to provide a global connectivity to roaming hosts, and as its consequence, it is possible to achieve such a global connectivity to roaming hosts.

The present invention discloses several algorithms to be used in three major types of nodes. These types are: mobile hosts which change their point of attachment to global data communications networks, mobile routers which control inner network side interfaces of moving networks, and other hosts on global data communications networks which conduct communications with mobile hosts and mobile routers. With full deployment of these algorithms, it is possible to deliver packets bound for/coming from networks in motion with minimum delay to intended destinations.

BEST MODE FOR CARRYING OUT THE INVENTION

Figure 1:
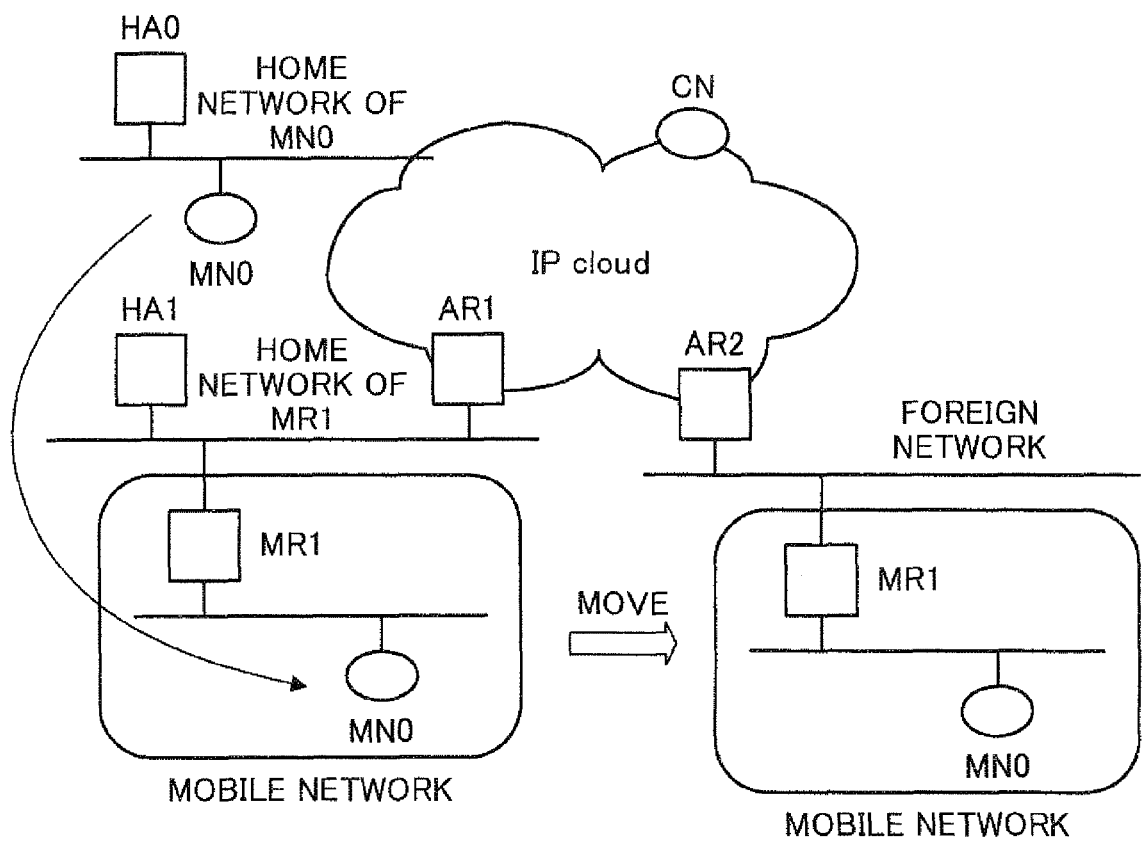
FIG. 1 is a diagram illustrating one example of a global network.

Embodiments of the present invention will be described in detail below with reference to the accompanying drawings.

This section discloses a method for providing roaming connection to other networks in a global network. To help understand the disclosed invention, the following definitions are used:

A "packet" is a self-contained unit of data of any possible format that could be delivered on a data network. A "packet" normally consists of two portions: a "header" and a "payload" portion. The "payload" portion contains data that are to be delivered, and the "header" portion contains information to aid the delivery of the packet. A "header" must have a source address and a destination address to respectively identify the sender and recipient of the "packet."

A "packet tunneling" refers to a self-contained packet being encapsulated into another packet. The act of "packet tunneling" is also referred to as "encapsulation" of packets. The packet that is being encapsulated is referred to as the "tunneled packet" or "inner packet", whereas the packet that encapsulates the "inner packet" is referred to as the "tunneling packet" or "outer packet." Here, the entire "inner packet" forms the payload portion of the "outer packet."

A "mobile node" is a network element that changes its point of attachment to a global data communications network, and it may be used with reference to an end-user terminal or an intermediate network element which functions as a gateway, a router, and an intelligent hub that can change its point of attachment to the global data communications network. An end user terminal, which is a "mobile node", is more clearly referred to as a "mobile host", while an intermediate network element which functions as a gateway, a router, or an intelligent hub, which is a "mobile node", is more clearly referred to as a "mobile router."

An "access router" of a mobile node is an intermediate network element which functions as a gateway, a router, or an intelligent hub, which is connected for the above-described mobile node to gain access to a global data communications network via the above-described network element.

A "home-address" is a primary global address assigned to a mobile node that can be used to reach the mobile node regardless of where on the global data communications network the mobile node is currently attached to.

A mobile node that is attached to the global data communications network where its home-address is topologically compatible with the addresses used in the vicinity of the point of attachment is referred to as "at home", and the vicinity of this point of attachment that is controlled by a single administrative authority is referred to as the "home domain" of the mobile node.

A mobile node that is attached to the global data communications network at a point where the home-address of the mobile node is topologically incompatible with the addresses used in the vicinity of that point of attachment is referred to as "away", and the vicinity of the point of attachment that is controlled by a single administrative authority is referred to as the "foreign domain."

A "care-of-address" is a temporary global address assigned to a mobile node that is away such that the assigned "care-of-address" is topologically compatible with the addresses used in the vicinity of the point of attachment to the global data communications network. Generally speaking, the "care-of-address" is effective only when a mobile node is attached to the same access router.

A "home agent" is a network entity that resides at the home domain of a mobile node that performs registration services of care-of-addresses of the mobile node in a case where the mobile node is away, and to forward packets addressed to the home-address of the mobile node to the care-of-address of the mobile node.

"Corresponding nodes" correspond to all network elements on a global communications network with which the mobile node is conducting communications.

A "Binding Update" is a message sent from a mobile node to its home agent, or to its corresponding nodes, which informs the recipient (the home agent or the corresponding node) the current care-of-address of the sender (the mobile node). This forms a "binding" between the care-of-address and the home-address of the mobile node at the recipient.

A "Binding Acknowledgement" is a message which is sent from the recipient of a Binding Update message to the sender of the above-mentioned Binding Update message, indicating the result of the binding.

A "routing header" is one piece of information added to a packet, indicating intermediate routers in a global data communications network to which the packet should be forwarded. Normally, a router in a global data communications network performs forwarding of packets based on their destination, whereas a "routing header" overwrites its behavior by including a list of intermediate destinations. In order to use a "routing header", a sender puts the address of his/her intended recipient in the last entry of a routing header, and places the first intermediate destination in the termination address of the packet. Receiving the packet, the first destination updates the packet provided with the "routing header", and subsequently, arranges so that the packet is forwarded to the second intermediate destination (that is, the termination address of the packet is replaced with the next entry in the "routing header"). This cycle is repeated until the packet reaches to the last intermediate destination, where the "routing header" is updated to allow the packet to be forwarded to its actually intended destination. For more detailed explanation on the operation of a "routing header", readers are advised to refer to Non-Patent Document 8.

Every network element which supports or implements a method and a mechanism disclosed in the present invention is referred to as an "invention-enabled" network element.

In the following description, for purpose of explanation, specific numbers, times, structures, and other parameters are set forth in order to provide a thorough understanding of the present invention; however it will be apparent to anyone skilled in the art that the present invention may be practiced without these specific details.

In a global data communications network, as network elements according to the disclosed invention are mixed with network elements which do not support the method and mechanism disclosed in the present invention, it is necessary for some kind of an invention-enabled router to indicate them that they can use the method and the mechanism described in this specification. This will be achieved by the router's inserting unique signals into messages which are occasionally broadcasted by the router to its neighboring apparatuses. A person skilled in the art should be able to recognize various existing methods which allow network elements to notify other network nodes of their capabilities.

Furthermore, according to the specific broadcast messages from the above-mentioned mobile router, mobile nodes connected to a network segment controlled by the mobile router should be able to know the home-address of the above-mentioned mobile router.

For example, under a circumstance of Internet Protocol Version 6 (Non-Patent Document 8), it is possible to insert home-address option into a router advertisement message identified by IPv6 vicinity search (Non-Patent Document 14), which is for advertising its home-address, and is sent by an invention-enabled router. The home-address option should include the next fields: (1) a type field for identifying that the option is home-address option (2) a length field indicating the size of the option, and (3) a home-address field for identifying the home-address of a sender.

Out of broadcast messages sent by an invention-enabled router, as described below, mobile nodes are subsequently able to have the home-address of the access router to which the mobile nodes are attached in Binding Update messages sent by the mobile nodes. This is possible only in a case where the access router is invention-enabled one.

It is possible to embed such information into Binding Update messages in variously implementable different methods, which depend on the basic protocol used in a global data communications network. For example, under a circumstance of Internet Protocol Version 6 (Non-Patent Document 8), an access-router-address option may be inserted in a Binding Update message specified in Mobile IPv6 (Non-Patent Document 7), and such an option should include the next fields: (1) an access-router-address option for identifying that the option is an access router home-address (2) a length field indicating the size of the option, and (3) an access-router-address field for identifying the home-address of the access router to which a sender is attached.

Figure 2:
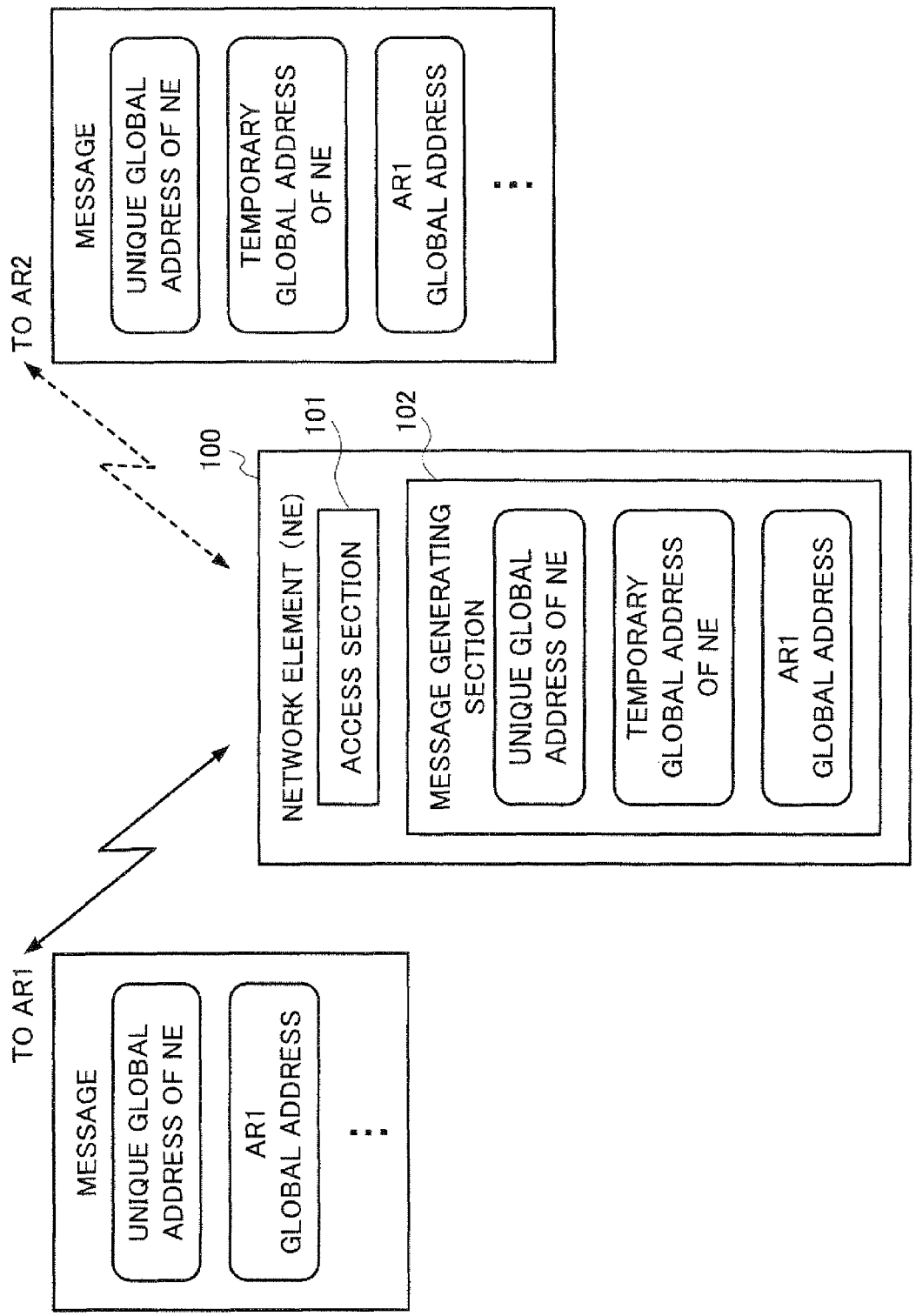
FIG. 2 is a block diagram illustrating the configuration of a network element apparatus according to an embodiment of the present invention.

FIG. 2 is a block diagram illustrating the main configuration of network element apparatus 100 which enables the operation described above. This network element apparatus 100 comprises access section 101 and message generating section 102.

Network element apparatus 100 possesses a global address which is uniquely assigned thereto in a global network, and is currently attached to access router AR1 using this address. Then, as the apparatus itself moves along, and as it becomes necessary to establish a roaming connection with another edge network which is not one to which the apparatus currently belongs, the following operation is conducted.

First of all, access section 101 gets access to access router 2 using another global address which is temporarily assigned to network element apparatus 100 from an upper station (not shown in the figure) in the global network.

Message generating section 102 generates a Binding Update message which contains a global address which is uniquely assigned to network element apparatus 100, a global address which is assigned temporarily, and a global address of access router AR1, which is a serving router before move.

Access section 101 transmits the Binding Update message generated at the message generating section to access router AR2, which is a serving router after move.

This allows access router AR2 and relay nodes thereafter to obtain the global address of access router AR1, which is the serving router before move of network element apparatus 100.

When an invention-enabled recipient (which may be a home agent for a mobile node or corresponding nodes) receives this Binding Update message, the recipient is able to record the message in a table or a list. Entries in such a table or a list, referred to as Binding Entries hereafter, should include at least the next three fields: (1) a home-address field containing the home-address of a mobile node (2) a care-of-address field containing the care-of-address of the mobile node, and (3) an access-router-address field containing the home-address of the access router. It is possible to take the values of these three fields out of a Binding Update message.

Figure 3:
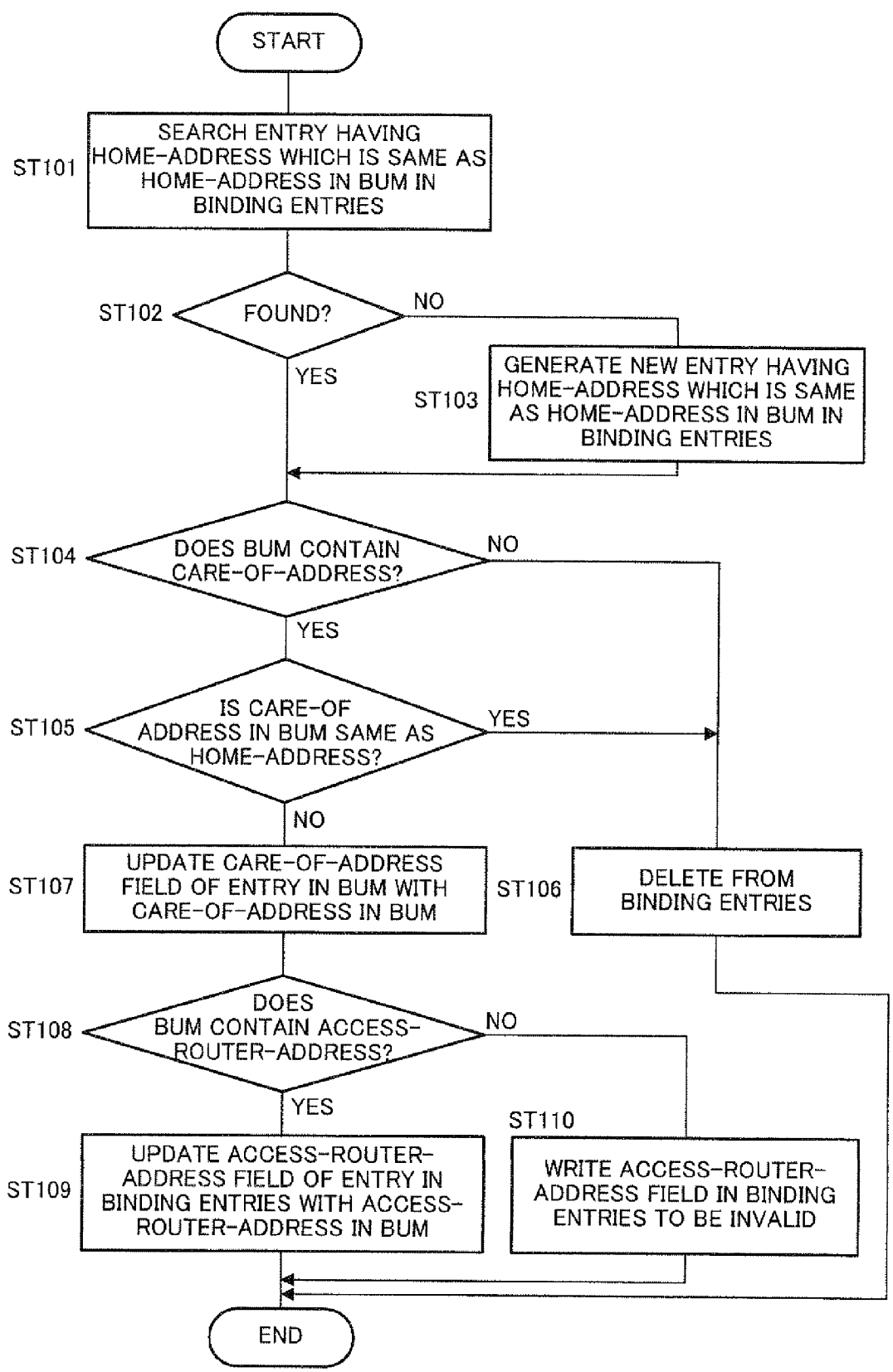
FIG. 3 is a flowchart illustrating one example of an algorithm used for updating Binding Entries.

FIG. 3 is a flowchart indicating an algorithm to be used at an invention-enabled network element for updating Binding Entries when the network element receives a Binding Update message (abbreviated as BUM in the figure).

In a step denoted as characters ST 101, an entry with a home-address field which is the same as the home-address in the Binding Update message is searched in Binding Entries. In a case where the searched entry is not found, a new entry is generated as illustrated in steps denoted as characters ST 102 and ST 103. Then, in a case where a care-of-address is not contained in the Binding Update message, or in a case where its care-of-address is the same as its home-address, it is assumed that the sender of the Binding Update message is now back to his/her home domain, and accordingly, the entry has been removed from the Binding Entries as illustrated in steps denoted as characters ST 104, ST 105, and ST 106. On the other hand, in a case where a care-of-address is contained in the Binding Update message, the care-of-address in the entry is updated into the care-of-address identified in the Binding Update message as illustrated in step denoted as character ST 107. Further in a case where the Binding Update message contains the home-address of an access router, as illustrated in steps denoted as characters ST 108 and ST 109, the access-router-address field in the entry is subjected to updating. In contrast, in a case where the Binding Update message does not contain the home-address of an access router, it is assumed that the sender of the Binding Update is attached to an access router which does not enable the present invention, and in such a case, as illustrated in step denoted as character ST 110, it is specified in the access-router-address field that the field is not valid.

The sender of a Binding Update is able to request a Binding Acknowledgement freely, which allows the recipient of the Binding Update to notify the sender thereof of the result of updating. In a case where an invention-enabled recipient who receives a Binding Update containing a valid access-router-address information replies with a Binding Acknowledgement, it is necessary to predetermine an index in the Binding Acknowledgement in such a manner that the recipient of the Binding Acknowledgement is able to guess that the sender of the Binding Acknowledgement is invention-enabled one. It should be obvious for a person skilled in the art that such an indexing may be achieved with, for example, a bit flag or a specific pattern of a bit stream in a Binding Acknowledgement, or in any other various methods not limited thereto.

Taking advantage of Binding Entries, it is possible for corresponding nodes or a home agent to construct a routing header which allows direct delivery to a mobile node. A routing header may be constructed so that a packet is first forwarded to the home-address of an access router, and then forwarded to the care-of-address of a mobile node. In this way, it is not necessary for a packet to traverse the home domain of a mobile node, and instead the packet is intercepted by a home agent and subsequently forwarded to the mobile node utilizing its care-of-address.

In a case where an access router itself is mobile and away, even if a routing header is used, it follows that a packet is still taking an indirect route. This is because a home domain route is set for a packet forwarded to the home-address of an access router, which is away. The home agent of the access router intercepts the packet, and forwards the packet to the access router utilizing the care-of-address of the access router.

By having an invention-enabled access router send a Binding Update to a home agent and corresponding nodes of an invention-enabled mobile node, it may be further possible to optimize packet delivery. In addition, If the access router is invention-enabled one, the home-address of the access router itself should be added in a Binding Update. In order to avoid a significant delay in a case where an access router moves (in a case where it is mobile), any invention-enabled mobile nodes should maintain a list of other hosts (both of a home agent and corresponding nodes) to which the node sent a Binding Update. Hereafter, such a list is referred to as a Bound Hosts List. In a case where a mobile node moves, the mobile node should notify hosts on Bound Hosts List by sending respective nodes Binding Updates, however, in order to avoid the burst of Binding Updates each time the mobile node moves, there should be a slight shift between consecutive transmissions of Binding Updates.

In a case where a mobile node and an invention-enabled access router sends notifications to hosts using Binding Updates, any home agent and corresponding invention-enabled nodes are able to obtain a sufficient knowledge related to the network topology on the periphery of the mobile node to optimize the delivery of packets to the mobile node. In order to do so, it is possible to employ an algorithm as illustrated below when a routing header is constructed from Binding Entries.

Figure 4:
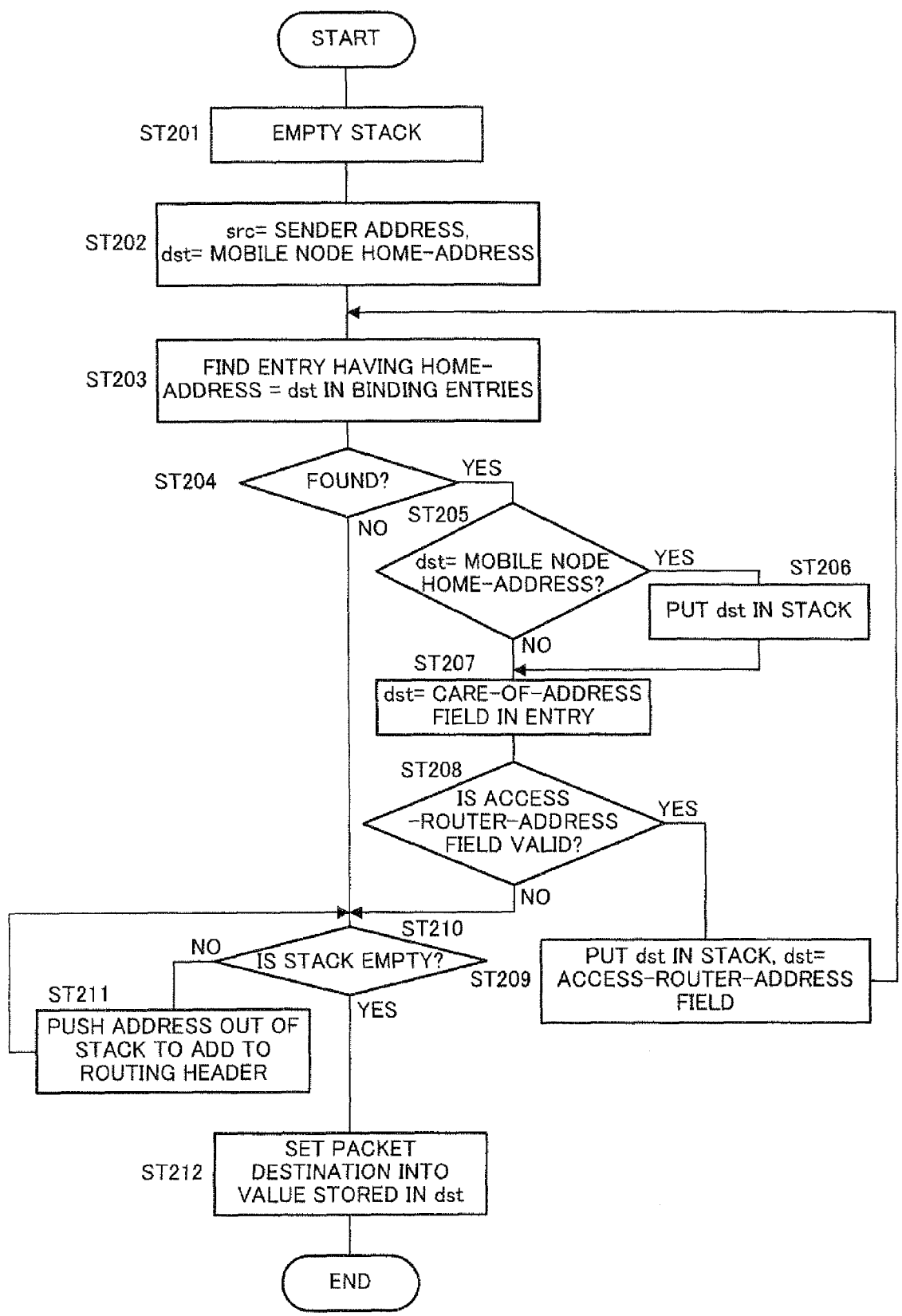
FIG. 4 is a flowchart illustrating one example of an algorithm used for constructing a routing header.

FIG. 4 is a flowchart indicating an algorithm to be used at a network host when constructing a routing header for delivering a packet directly to a mobile node. Binding Entries are used for obtaining the care-of-addresses of mobile nodes and their access routers in a recursive manner, whereas a stack is used for storing these addresses, making it possible to return the addresses in reverse order when constructing a routing header.

In this algorithm, a stack (last-in-first-out information storage structure) is used to aid the construction of a routing header. In a step denoted as character ST 201, a stack is initialized to empty itself, and then as illustrated in a step denoted as character ST 202, two of temporary variables "src" and "dst" are respectively set with the address of the packet source (i.e. the home agent or corresponding nodes which send the packet) and the address of its termination (i.e. the home-address of the mobile node). Subsequently, the algorithm enters the processing loop illustrated in steps denoted as characters ST 203-ST 209, and in that loop, a search in Binding Entries is conducted for an entry having a home-address field matching with the value stored in dst. In a case where the searched entry is not found, the processing leaves the loop as illustrated in steps denoted as characters ST 203 and ST 204, whereas in a case where the searched entry is found, the value in dst is checked to confirm whether the value is the home-address of the mobile node or not (a correct result should be obtained only at the first repetition of the loop). In a case where the value is confirmed to be the home-address of the mobile node, as illustrated in steps denoted as characters ST 204, ST 205, and ST 206, the value in dst is put into the stack.

Next, as illustrated in step denoted as character ST 207, the algorithm updates the value in dst to be stored in the care-of-address field found in the Binding Entries. Thereafter, the access-router-address field of the Binding Entries is checked to confirm whether the field contains a valid address or not. In a case where the field contains a valid address, the loop is repeated as illustrated in steps denoted as characters ST 208 and ST 209. In the ST 209, the contents of the dst field is also put in the stack, whereas in a case where the access-router-field is invalid, the processing exits the loop. Once the processing leaves the loop, as illustrated in steps denoted as characters ST 210 and ST 211, the contents of the stack is pushed out in reverse order to be added to the routing header. Furthermore, in a case where the stack is emptied, as illustrated in step denoted as character ST 212, the packet termination field is set into the value stored in dst, and the algorithm ends.

On the other hand, though a routing header constructed in this way makes it possible to optimize the routing of a packet delivered to a mobile node, it also invites some kind of security threat. The most serious threat lies in that an attacker is able to construct a specific routing header which reflects a packet from a node in a mobile network, and as its consequence, it becomes possible for the attacker to reach the part of a global data communications network where the attacker would not be accessible if s/he were using other methods. In order to avoid such a security violation, any invention-enabled mobile nodes should follow the algorithm described below to discard all packets which are suspicious to be forged.

Figure 5:
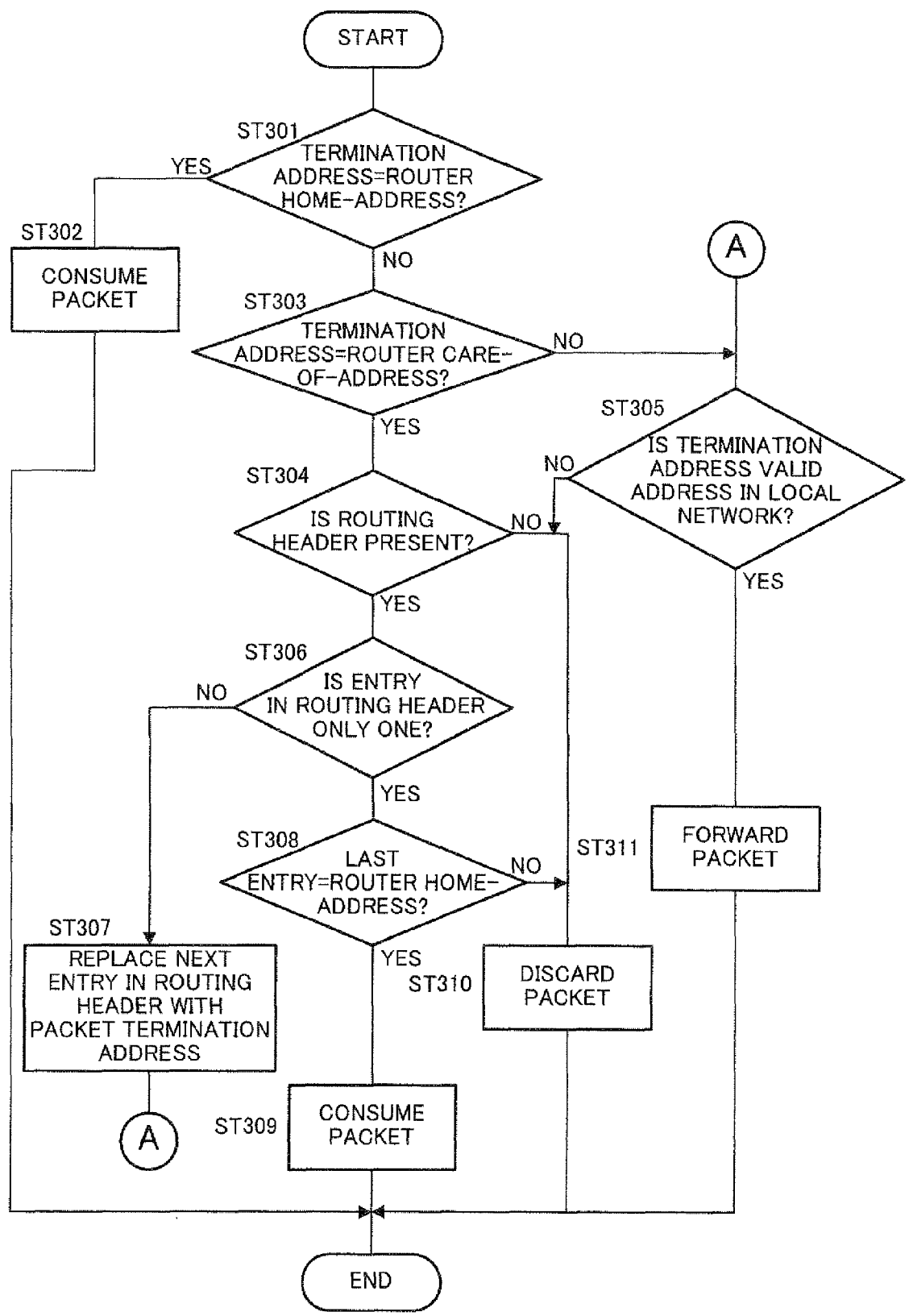
FIG. 5 is a flowchart illustrating one example of an algorithm used for security verification by a router.

FIG. 5 is a flowchart indicating an algorithm to be executed by a router when the router intercepts a packet transmitted to one connected to the router in a local network. This test sequence makes it possible to reduce the vulnerability of the local network against security threats.

Upon interception of a packet by a router, as illustrated in steps denoted as characters ST 301 and ST 303, first of all, the router checks whether its termination address matches with its home-address or its care-of-address. In a case where the termination address matches with the home-address, as illustrated in step denoted as character ST 302, the packet is consumed (used). Or in a case where the termination address matches with the care-of-address, as illustrated in step denoted as character ST 304, the presence of a routing header is checked. Further in a case where the termination address does not match with the home-address nor the care-of-address, as illustrated in step denoted as character ST 305, it is checked whether the termination address is a valid address in the local area network connected to the router or not. In a case where the termination address is a valid address in the local area network connected to the router, as illustrated in step denoted as character ST 311, the packet is forwarded to its destination, whereas in a case it is not, the packet is discarded as illustrated in step denoted as character ST 310.

In addition, in step denoted as character ST 304, the presence of the routing header is checked, and in a case where it is not present, the packet is discarded as illustrated in step denoted as character ST 310. Or in a case where the routing header is present, it is checked whether the next address in the routing header is the last entry or not. In a case where the next address in the routing header is not the last entry, the entry is replaced with the termination address of the packet, and as illustrated in steps denoted as characters ST 306, ST 307, and ST 305, it is checked again whether the termination address is a valid address in the local area network connected to the router or not; whereas in a case where the next address in the routing header is the last entry, as illustrated in steps denoted as characters ST 306, and ST 308, the last entry is checked to confirm whether it is the home-address of the router or not. In a case where it is the home-address, as illustrated in step denoted as character ST 309, the packet is consumed (used), whereas in a case where it is not, the packet is discarded as illustrated in step denoted as character ST 310.

Figure 6:
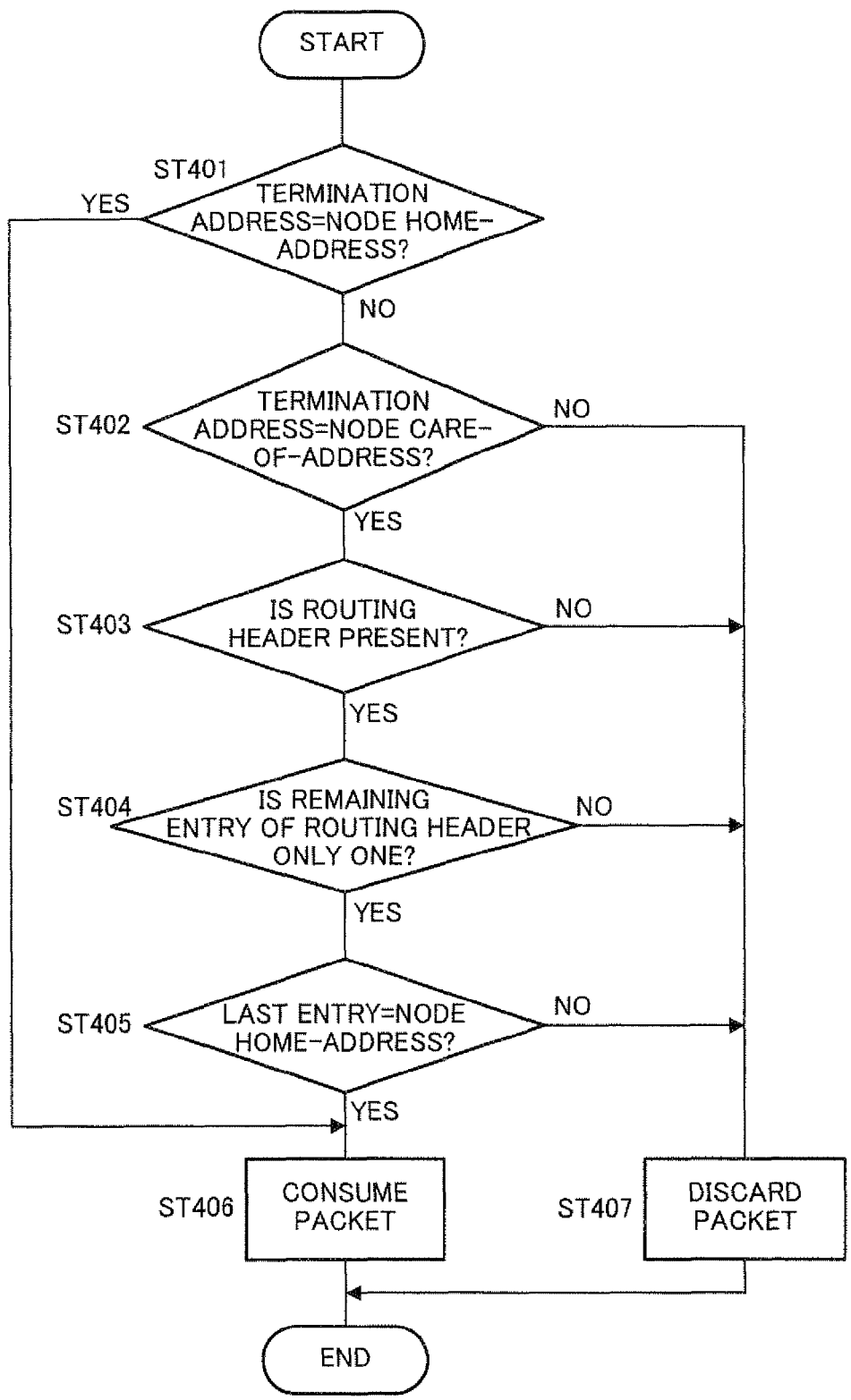
FIG. 6 is a flowchart illustrating one example of an algorithm used for security verification by a mobile node.

FIG. 6 is a flowchart indicating an algorithm to be used by a mobile node (i.e. a mobile node which is not functioning as a router), and this figure illustrates check processing performed by a mobile node when the mobile node receives a packet. The check process described herein makes it possible to reduce the vulnerability of the mobile nodes against security threats.

First of all, in step denoted as character ST 401, the termination address is checked to confirm whether it is the home-address of the mobile node or not. If Yes, as illustrated in step denoted as character ST 406, the packet is consumed (used), whereas in a case where it is not, the termination address is checked to confirm whether it is the care-of-address of the mobile node or not as illustrated in step denoted as character ST 402. In a case where it is not the care-of-address of the mobile node, as illustrated in step denoted as character ST 407, the packet is discarded, whereas in a case where the termination address matches with the care-of-address of the mobile node, the presence of a routing header is checked. Further as illustrated in a series of check steps denoted as characters ST 403, ST 404, and ST 405, the remaining routing header entry is one, and therefore, that entry must be the home-address of the mobile node. In a case where either of these tests fails as illustrated in step denoted as character ST 407, the packet is discarded, whereas in a case where all of the tests are passed, the packet is consumed (used) as illustrated in step denoted as character ST 406.

The above descriptions fully explain a method which delivers a packet to a mobile node without passing through a home agent of the mobile node and an access router, thereby decreasing delivery latency. The next disclosed descriptions focus on a packet sent from a mobile node. It should be noted herein that, in a case where a mobile node which is away sends a packet, it uses its care-of-address as a packet source. In many deployed packet-switched data network, this is done because ingress filtering is employed for a security reason. Ingress filtering applies the discarding of a packet from a local network because a discarded packet has a source address which is topologically incompatible with an address used in the above-mentioned local network. In a case where a mobile node which is away uses its home-address as a source address in order to send a packet from within a foreign domain, there is a possibility that the packet is discarded due to ingress filtering. Accordingly, in order to avoid the ingress filtering, its care-of-address (an address which has a topological compatibility with an address used in a foreign domain) is employed as a source address. To help the recipient to identify the creator of the packet, the mobile node which is away includes its home-address in the header of the packet. Accordingly, summarizing the above, in a case where the mobile node which is away sends a packet, the mobile node fills its care-of-address in the source address of the packet, and inserts its home-address as special information in the packet header.

In a case where the mobile node is aware that the access router is invention-enabled one, it becomes possible for the access router to forward the packet sent from the mobile node directly to its destination without involving the tunneling of the packet between the access router and the home agent of the access router.

This becomes implementable by inserting a signal in the packet header. It is possible to configure this signal to be any arbitrary format of bits or a specific pattern of a bit stream. With the presence of such a signal, it is indicated to an invention-enabled router without using any packet tunneling or encapsulation technique that the sender of the packet is requesting the router for an attempt to forward the packet directly to its destination. In this document, this signal is referred to as a "direct forwarding request" hereafter.

In addition, in a case where any router at later location does not wish for an attempt to forward the packet directly to its destination without using any packet tunneling or encapsulation technique, it is possible for an intermediate router to disable the direct forwarding request signal. In a case where any invention-enabled mobile router intercepts this packet, and then becomes aware that the direct forwarding request is specified in the packet, the mobile router then checks whether the source address of the packet is a valid address from the local network or not. If not done, it means that there is at least one intermediate network element which does not enable the present invention between the creator of the packet and the router itself, and in such a case, the router is unable to execute direct forwarding. Next, the mobile router checks whether the packet has a Binding Update provided with a specific destination or not. If so, the mobile router changes the source address into the care-of-address to send the packet to its destination. On the other hand, with respect to other cases, the packet is subjected to encapsulation to be tunneled to the home agent of the mobile router, and is subjected to decapsulation at the home agent of the mobile router to be forwarded to its actual destination. Of course, this is based on the premise that the mobile router is away from its home, and in a case where it is at home, there is no necessity to check the direct forwarding request. All packets from the local network intercepted by the mobile router are forwarded to its destination by default without the necessity to tunnel the packet to the home agent.

Figure 7:
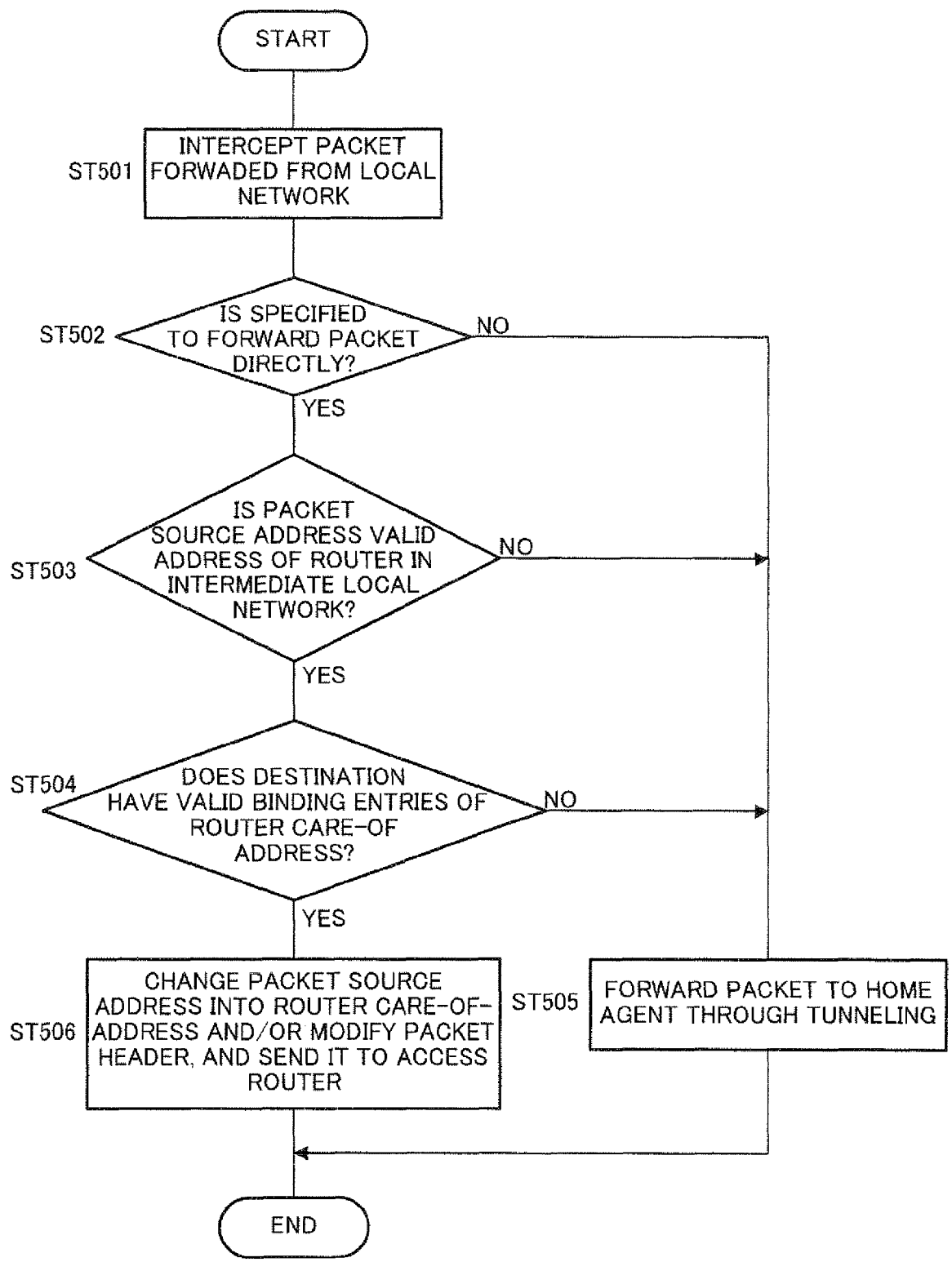
FIG. 7 is a flowchart illustrating one example of an algorithm for handling a direct forwarding request.

FIG. 7 is a flowchart indicating an algorithm to be used by a router for processing of an outbound packet, that is, a packet sent out by a node in a local network connected to the router toward other host on a global data communications network.

As illustrated in step denoted as character ST 501, in a case where an invention-enabled mobile router which is away from home intercepts a packet, first of all, the mobile router checks whether the packet is characterized by a direct forwarding request or not as illustrated in step denoted as character ST 502. Next, as illustrated in step denoted as character ST 503, it is checked that the source address in the packet is a valid address of the mobile router in the local network. Finally, as illustrated in step denoted as character ST 504, the specified destination is checked to confirm whether it is where the mobile router has sent a Binding Update before or not. In a case where any answer for the three tests are negative, as illustrated in step denoted as character ST 505, the packet is forwarded to the home agent through tunneling. On the other hand, if not so, the packet is forwarded directly as illustrated in step denoted as character ST 506. Herein, the invention-enabled mobile router modifies the packet header, and as its consequence, the source address is replaced with the care-of-address.

Because the source address of a packet is changed by a router on its way, there must be a method which allows the recipient of the packet to verify that the packet has been sent out from a reliable source, Containing the home-address of the mobile node which sends the packet in the packet header provides one form of verification methods. However, it is possible for an attacker to forge a packet, and then insert forged home-address information in its packet header. Therefore, it is critically important for the recipient to be able to verify that the source address of a received packet is the access router of an invention-enabled authorized sender (the sender herein relates to a mobile node having a specified home-address). As one method for that purpose, there is a method for checking through Binding Entries, which makes it possible to verify that the source address of a received packet is linked with the home-address inserted in its packet header.

Figure 8:
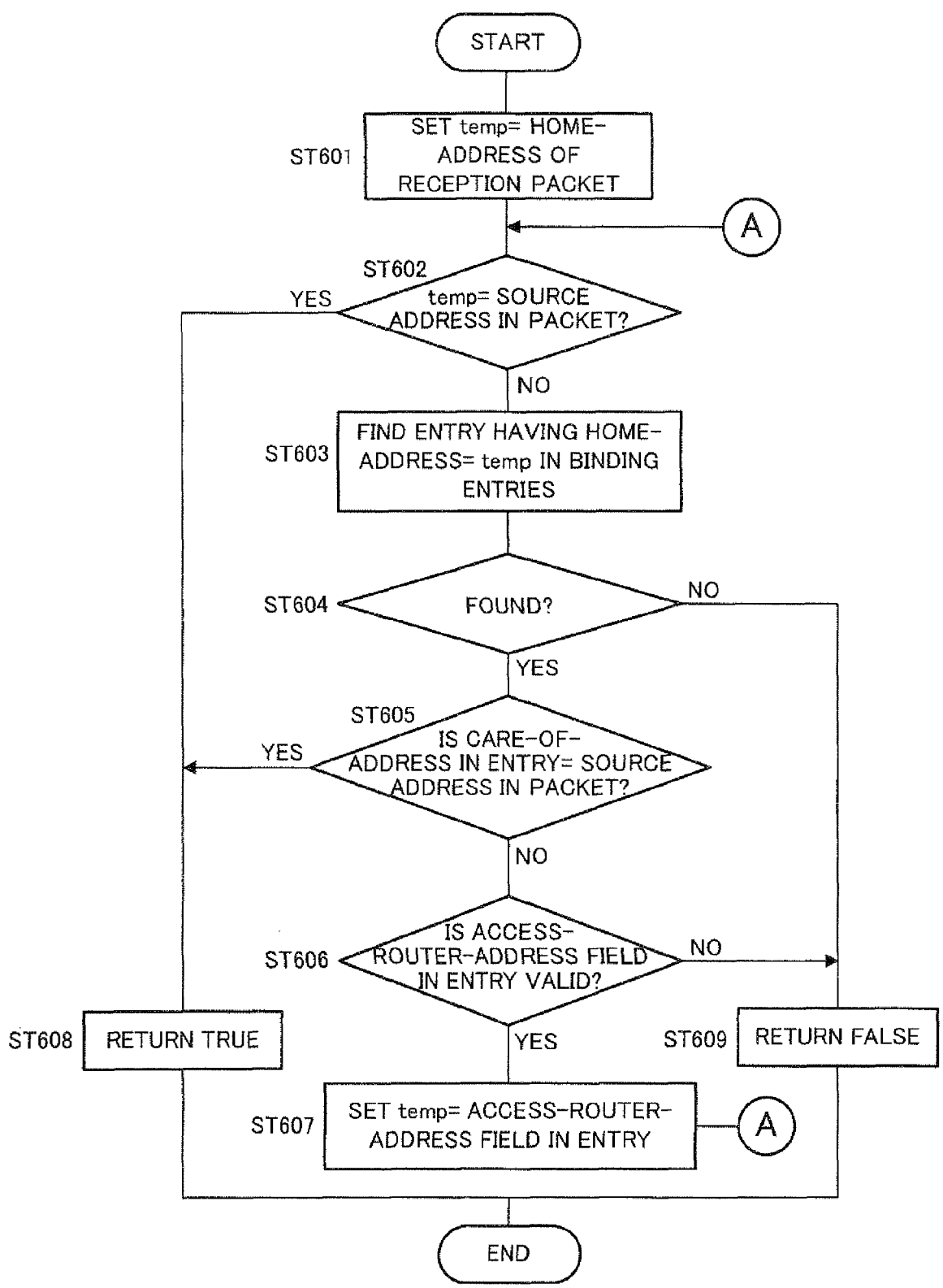
FIG. 8 is a flowchart illustrating one example of an algorithm used for security verification by other host.

FIG. 8 is a flowchart illustrating a processing algorithm for verifying such a relation. Namely, the figure shows a verification process used by a network host such as a home agent or corresponding nodes in order to check that a packet having a specified source address is linked with the home-address contained in its packet header by the last Binding Update. The algorithm which is basically illustrated in the figure investigates repetitive Binding Entries in order to verify the relation between the source address and the home-address.

In a case where the relation is verifiable, the algorithm shown in this figure returns a Boolean value TRUE, or returns a Boolean value FALSE otherwise. First of all, upon start of the algorithm, as illustrated in step denoted as character ST 601, a variable "temp" is initialized in order to store the home-address identified in the packet header. The algorithm subsequently enters a loop (a loop denoted with characters ST 602-ST 607) in order to check the Binding Entries in detail. First, the value in temp is checked against the source address of the packet. If they match up, the algorithm returns TRUE as illustrated in step denoted as character ST 602, whereas if they do not match up, the algorithm searches for an entry having a home-address field matching with the value stored in temp in the Binding Entries as illustrated in step denoted as character ST 603. If the searched entry is not found, the algorithm returns FALSE as illustrated in step denoted as character ST 604, whereas if the searched entry is found, the algorithm compares the source address of the packet with the care-of-address field of the found entry as illustrated in step denoted as character ST 605. In a case where the two are identical to each other, the relation is verified, and the algorithm returns TRUE, whereas in a case where the two are not identical to each other, as illustrated in step denoted as character ST 606, it is checked whether the access-router-address field of the found entry contains a valid entry or not. In a case where the access-router-address field is not valid, the algorithm returns FALSE, whereas in a case where the access-router-address field is valid, the address in the access-router-address field is stored in temp, and the loop is repeated as illustrated in step denoted as character ST 607.

There is a necessity for a invention-enabled basic node to execute Binding Entries and an algorithm as illustrated in FIG. 3 which updates the Binding Entries. In addition, it should characterize a Binding Acknowledgement with such special information that allows the recipient of the Binding Acknowledgement to recognize that information related to the home-address of the access router in the corresponding Binding Update message is received.

Furthermore, with respect to security, there is a necessity for an invention-enabled node to execute an algorithm as illustrated in FIG. 8 which checks the source address of the received packet. After all, it is necessary for an invention-enabled basic node to execute an algorithm as illustrated in FIG. 4 which constructs a routing header so that it becomes possible to optimize the delivery of a packet to an invention-enabled mobile node.

Further in addition, it follows that an invention-enabled node starts the forwarding of a packet to the sender of a Binding Update message through a specific access router shortly after receiving the Binding Update message having additional information related to the home-address of the access router to which the above-mentioned sender is attached. This means that any arbitrary packet transmitted from an invention-enabled node after the reception of a Binding Update has one of the following characteristics: (1) the above-mentioned packet has a source address field which is set into the home-address of an access router, accompanied by a routing header containing the care-of-address and the home-address of the above-mentioned sender of the Binding Update only (2) the above-mentioned packet has a source address field which is set into the home-address of an access router, accompanied by a routing header containing the care-of-address of the above-mentioned sender of the Binding Update as the initial entry.

The above-mentioned access router should also send a Binding Update containing its care-of-address to the same invention-enabled node, and a packet transmitted from the invention-enabled node has one of the following characteristics: (1) the above-mentioned packet has a source address field which is set into the care-of-address of an access router, accompanied by a routing header containing the care-of-address and the home-address of the above-mentioned sender of the Binding Update only (2) the above-mentioned packet has a source address field which is set into the care-of-address of an access router, accompanied by a routing header containing the care-of-address of the above-mentioned sender of the Binding Update as the initial entry, or (3) the above-mentioned packet is appended with a routing header containing the care-of-addresses of the above-mentioned sender of the Binding Update and the access router, where the care-of-address of the access router is to be placed just before the care-of-address of the above-mentioned sender of the Binding Update.

In addition to such functions specified for an invention-enabled basic node, an invention-enabled mobile node must be implemented with a function to insert a direct forwarding request in a packet and a function to insert the home-address of the access router in a Binding Update message. In a case where a mobile node does not function as a mobile router, it is necessary to execute an algorithm as illustrated in FIG. 6 for checking input packets.

In addition to what is specified for an invention-enabled mobile node, an invention-enabled mobile router has to implement a function to check packets from a local network (i.e. the inner network side interface of the above-mentioned router (ingress interface)) for a direct forwarding signal as illustrated in FIG. 7. In addition, with respect to a packet arriving from the outer network side interface (egress interface) as illustrated in FIG. 5, the router has to conduct a security check.

Furthermore, after reception of a packet containing a direct forwarding request signal from the inner network side interface, an invention-enabled node may simply forward the packet by changing the source address of the above-mentioned packet into the care-of-address or the home-address of the node itself. This happens when the Bound Host List of an access router contains a host specified in the destination field of the packet, and in a case where the specified destination is not listed on the Bound Host List, an invention-enabled router is also able to send a Binding Update message to the specified destination.

The 1st aspect of the present invention is a method for providing global connectivity to roaming networks used in an internetworking of packet-switched data communications networks, wherein network elements in the communications networks are uniquely addressed by a primary global address such that the network element can be reached even when it is roaming anywhere in the communication networks, whereas the network elements that are roaming with in the communications networks can be assigned with a temporary global address for a duration of which the roaming network element is attached to a single access router, through which the roaming network element gains access to a global data communications network, comprising the step of sending a Binding Update message from the roaming network element to a singular or plural other network elements, wherein the Binding Update message contains the primary global address and the temporary global address of the sending roaming network element, for which the objective is to allow the receiving network elements relate the specified temporary global address to the specified primary global address, and further contains the primary global address of the access router to which the roaming network element is currently attached.

The 2nd aspect of the present invention is the above-described method for providing the global connectivity to the roaming networks used in the internetworking of the packet-switched data communications networks, wherein the network element in the internetworking of the packet-switched data communications networks adds a data format to a Binding Update message in order to insert the primary global address of the access router to which the roaming network element is attached in the Binding Update message) wherein the data format has (i) a type field for making it possible to identify that the data format contains the primary global address of the access router to which the sender is attached (ii) a length field for making it possible to identify the length of the data format (iii) an Access-Router-Address field containing the primary global address of the access router to which the sender is attached.

The 3rd aspect of the present invention is the above-described method for providing the global connectivity to the roaming networks, used in the internetworking of packet-switched data communications networks, wherein the access router in the internetworking of the packet-switched data communications networks adds a data format to an advertisement message in order to insert its primary global address of the access router in the advertisement message, wherein the data format has (i) a type field for making it possible to identify that the data format contains the primary global address of the sender (ii) a length field for making it possible to identify a length of the data format (iii) an Access-Router-Address field containing the primary global address of the sender.

The 4th aspect of the present invention is a method for providing a global connectivity to roaming networks used among a plurality of network elements in the internetworking of packet-switched data communications networks, wherein one of the network elements roams in the internetworking of the packet-switched data communications networks, the method comprising the steps of: (i) transmitting the Binding Update message from the roaming network element to another network element containing a predetermined global address and a temporary global address assigned additionally to the roaming network element performing the transmission so that the receiving network element is able to associate the specified temporary global address with the specified primary global address and further containing the primary global address of the access router to which the roaming network element is currently attached (ii) replying from the recipient of the Binding Update message to the roaming network element using a Binding Acknowledgement message, wherein the Binding Update message contains information related to the reception or rejection of the Binding Update message, and further contains information indicating that a function is provided to notify the recipient of the Binding Update message that the sender of the Binding Acknowledgement message is able to understand and take an appropriate action with respect to the inclusion of the primary global address of the access router in the Binding Update message.

The 5th aspect of the present invention is the above-described method for providing the global connectivity to the roaming networks, wherein, in a case where a network entity receives a Binding Update message, the network entity is able to record the Binding Update message in Binding Entries, further wherein the binding entry is made up of the following fields: (i) a Home-Address field containing the primary global address of the roaming network element (ii) a Care-Of-Address field containing the temporary global address of the roaming network element (iii) an Access-Router-Address field containing the primary global address of the access router to which the roaming network element is attached.

The 6th aspect of the present invention is the above-described method for providing the global connectivity to the roaming networks, wherein, in a case where the network entity receives the Binding Update message, the network entity updates Binding Entries, the method comprising the steps of: (i) checking whether the Binding Entries contain an entry having the Home-Address field matching with the primary global address specified in the received Binding Update message, and creating a new entry in a case w here no entry is found (ii) deleting the entry in the Binding Entries having the Home-Address field matching with the primary global address specified in the received Binding Update message in a case where the Binding Update message does not contain information related to the temporary global address of the sender of the Binding Update message (iii) deleting the entry in the Binding Entries having the Home-Address field matching with the primary global address specified in the received Binding Update message in a case where the information related to the temporary global address is contained in the Binding Update message matching with the Home-Address field in the entry (iv) setting the Care-Of-Address field of the entry into the temporary global address specified in the received Binding Update message in a case where the temporary global address is contained in the received Binding Update message, and the value is not the same as the Home-Address field in the entry (v) setting the Access-Router-Address field of the entry into the primary global address of the access router specified in the Binding Update message in a case where it is present, (vi) setting the Access-Router-Address field of the entry to be invalid in a case where the received Binding Update message does not contain information related to the primary global address of the access router.

The 7th aspect of the present invention is the above-described method for providing the global connectivity to the roaming networks, wherein the network element constructs a routing header added to a data packet, further wherein the routing header is used to instruct the network element to which destination is indicated with termination address specified in the packet to forward it to another destination, the method comprising the steps of: (i) emptying last-in-first-out data structure to initialize a temporary variable in order to store the primary global address of the final destination of the packet (ii) searching for an entry whose Home-Address field contains the same address as one stored in the above-mentioned temporary variable in the Binding Entries (iii) storing the value of the temporary variable in the upper tier of the last-in-first-out structure in a case where the entry is found in the Binding Entries and where the value of the temporary global address matches with the primary global address of the final destination of the packet (iv) storing the value contained in the Care-Of-Address field of the entry in the temporary variable in a case where the entry is found in the Binding Entries (v) storing the value of the temporary variable in the upper tier of the last-in-first-out structure in a case where the entry is found in the Binding Entries, and then storing the value in the Access-Router-Address field of the entry in the temporary value (vi) repeating the steps (ii), (iii), (iv) and (vi) in a case where the Access-Router-Address field of the entry is valid (vii) repeating the deletion of the value of the upper tier in last-in-first-out data structure and the addition of the deleted value to a routing header accompanying the data packet until the last-in-first-out data structure is emptied in a case where the entry in the Binding Entries is found or where the Access-Router-Address field of the found entry is invalid (viii) setting the value stored in the temporary variable into the termination address of the data packet.

The 8th aspect of the present invention is the above-described method for providing the global connectivity to the roaming networks, the method further comprising the steps of: inserting a unique signal in the data packet to make a request to the access router to which the network element is attached so that the network element is able to forward the data packet directly to the destination specified in the data packet.

The 9th aspect of the present invention is the above-described method for providing the global connectivity to the roaming networks, the method further comprising the steps of invalidating the unique signal in the data packet which is made clear in the above-described method so that the series of intermediate routers do not forward the data packet directly to the destination specified in the data packet.

The 10th aspect of the present invention is the above-described method for providing the global connectivity to the roaming networks, wherein an intermediate network element in the internetworking of the packet-switched data communications networks performs the processing of a data packet received from its inner network side interface, and the intermediate network element functions as a bridge router between a single or a plurality of local data communications network of its inner network side interface and the internetworking of the packet-switched data communications networks of its outer network side interface, the method comprising the steps of: (i) forwarding the received packet in a case where the intermediate network element does not roam in the internetworking of the packet-switched data communications networks (ii) encapsulating the received packet using another newly created packet in order to transmit it to a specific network element in the internetworking of the packet-switched data communications networks, wherein, in a case where the intermediate network element roams in the internetworking of the packet-switched data communications networks and where the element is assigned the temporary global address, if the received packet does not contain a unique address or if the unique signal is invalidated, the specific network element extracts the original data packet out of the newly created packet to forward it to the destination (iii) encapsulating the received packet using another newly created packet in order to transmit it to a specific network element in the internetworking of the packet-switched data communications networks, wherein, in a case where the intermediate network element roams in the internetworking of the packet-switched data communications networks and where the element is assigned the temporary global address, if the source address specified in the received packet is not a valid address in the local network of the inner network side interface of the intermediate network element, the specific network element extracts the original data packet out of the newly created packet to forward it to the destination (iv) encapsulating the received packet using another newly created packet in order to transmit it to a specific network element in the internetworking of the packet-switched data communications networks, wherein, in a case where the intermediate network element roams in the internetworking of the packet-switched data communications networks and where the element is assigned the temporary global address, if the termination address specified in the received packet is not sent with the Binding Update message by the intermediate network element, and where the Binding Update message contains the primary global address and the current temporary global address, the specific network element extracts the original data packet out of the newly created packet to forward it to the destination (v) changing the source address of the received packet into the temporary global address of the intermediate network element, and then forwarding the received packet to the specified destination if the received packet contains the unique signal and if the source address specified in the received packet is a valid address in the local network of the inner network side interface of the intermediate network element, and further if the termination address specified in the received packet has been sent in advance with the Binding Update message by the intermediate network element, which contains the primary global address and the current temporary global address of the intermediate network element in a case where the intermediate network element roams in the internetworking of the packet-switched data communications networks and where the element is assigned the temporary global address.

The 11th aspect of the present invention is the above-described method for providing the global connectivity to the roaming networks, wherein an intermediate network element in the internetworking of the packet-switched data communications networks checks whether a source address specified in a received packet addressed to the network element is an authentic one or not, the received data packet containing information related to an address which is the primary global address of the access router to which the sender of the received packet is attached, and which is different one from the source address specified in the received data packet, the method comprising the steps of: (i) initializing a temporary variable in order to store the primary global address contained in the received data packet (ii) declaring that the source address is an authentic one in a case where the value stored in the temporary variable matches with the source address specified in the data packet (iii) searching for an entry in the Binding Entries which has the value matching with the value stored in the temporary variable in the Home-Address field in a case where the value stored in the temporary variable does not match with the source address specified in the data packet (iv) declaring that the source address is not an authentic one if no entry in the Binding Entries which has the value matching with the value stored in the temporary variable in the Home-Address field is found in a case where the value stored in the temporary variable does not match with the source address specified in the data packet (v) declaring that the source address is an authentic one in a case where an entry in the Binding Entries is found, if the Care-Of-Address field of the entry in the Binding Entries contains a value matching with the source address specified in the data packet (vi) declaring that the source address is not an authentic one in a case where an entry in the Binding Entries is found, and where the Care-Of-Address field of the entry contains a value not matching with the source address specified in the data packet, if the Access-Router-Address field of the entry is invalid (vii) storing contents contained in the Access-Router-Address field of the entry into the temporary variable in a case where an entry in the Binding Entries is found, and where the Care-Of-Address field of the entry contains a value not matching with the source address specified in the data packet (viii) repeating the steps (iii), (iv), (v), (vi), and (vii) in a case where the Access-Router-Address field of the entry is valid.

The 12th aspect of the present invention is the above-described method for providing the global connectivity to the roaming networks in order to send a data packet containing a routing header, wherein the method is used after a successful reception of the Binding Update message containing the primary global address of the access router to which the sender of the Binding Update message is attached, the method comprising the steps of: (i) setting the source address of the data packet to be the primary global address of the access router (ii) setting so that the routing header contain the temporary global address and the primary global address of the sender of the Binding Update message only.

The 13th aspect of the present invention is the above-described method for providing the global connectivity to the roaming networks in order to send a data packet containing a routing header, wherein the method is used after a successful reception of the Binding Update message containing the primary global address of the access router to which the sender of the Binding Update message is attached, the method comprising the steps of: (i) setting the source address of the data packet to be the primary global address of the access router (ii) setting so that the routing header contain the temporary global address of the sender of the Binding Update message as the initial entry.

The 14th aspect of the present invention is the above-described method for providing the global connectivity to the roaming networks in order to send a data packet containing a routing header, wherein the method is used after a successful reception of the first Binding Update message containing the primary global address of the access router to which the sender of the Binding Update message is attached, and after a successful reception of the second Binding Update message which is transmitted by the access router and contains the temporary global address of the access router, the method comprising the steps of: (i) setting the source address of the data packet to be the primary global address of the access router (ii) setting so that the routing header contain the temporary global address and the primary global address of the sender of the first Binding Update message only.

The 15th aspect of the present invention is the above-described method for providing the global connectivity to the roaming networks in order to send a data packet containing a routing header, wherein the method is used after a successful reception of the first Binding Update message containing the primary global address of the access router to which the sender of the Binding Update message is attached, and after a successful reception of the second Binding Update message which is transmitted by the access router and contains the temporary global address of the access router, the method comprising the steps of: (i) setting the source address of the data packet to be the temporary global address of the access router (ii) setting so that the routing header contain the temporary global address of the sender of the first Binding Update message as the initial entry.

The 16th aspect of the present invention is the above-described method for providing the global connectivity to the roaming networks in order to send a data packet containing a routing header, wherein the method is used after a successful reception of the first Binding Update message containing the primary global address of the access router to which the sender of the Binding Update message is attached, and after a successful reception of the second Binding Update message which is transmitted by the access router and contains the temporary global address of the access router, the method comprising the step of setting so that the routing header contain the temporary global address of the sender of the first Binding Update message and the temporary global address of the access router as the initial entry and that the temporary global address of the access router appears just before the temporary global address of the sender of the first Binding Update message in the routing header.

The 17th aspect of the present invention is the above-described method for providing the global connectivity to the roaming networks, wherein the network element roams in the internetworking of communications networks, and functions as a bridge router between a single or a plurality of local data communications network of its inner network side interface and the internetworking of the packet-switched data communications networks of its outer network side output interface, and after receiving the data packet containing the unique signal from its inner network side interface, the method comprising the steps of: (i) changing the source address of the data packet into its temporary global address (ii) forwarding the data packet to its outer network side interface.

The 18th aspect of the present invention is an apparatus used in a network element which is used in the internetworking of the packet-switched data communications networks as made clear from the above-described method, comprising means for realizing the following methods: (i) a method of using the Binding Entries as made clear from the above (ii) a method of updating the Binding Entries as made clear from the above (iii) a method of inserting instructions into a Binding Acknowledgement message, and thereby making it possible to notify the recipient of the Binding Acknowledgement message that the sender is able to understand and take an appropriate action to have the Binding Update message contain the primary global address of the access router with the presence of such instructions as made clear from the above (iv) a method of checking the source address of a data packet as made clear from the above (v) a method of constructing a routing header as made clear from the above.

The 19th aspect of the present invention is an apparatus used in a network element which is used in the internetworking of the packet-switched data communications networks as made clear from the above-described method, wherein the network element roams in the internetworking of communications networks, comprising means for realizing the following methods: (i) a method of using the Binding Entries as made clear from the above (ii) a method of updating the Binding Entries as made clear from the above (iii) a method of inserting instructions into a Binding Acknowledgement message, and thereby making it possible to notify the recipient of the Binding Acknowledgement message that the sender is able to understand and take an appropriate action to have the Binding Update message contain the primary global address of the access router with the presence of such instructions as made clear from the above (iv) a method of checking the source address of a data packet as made clear from the above (v) a method of constructing a routing header as made clear from the above (vi) a method of inserting into a data packet a signal requesting the access router to which the network element is attached to forward the data packet directly to a destination specified in the data packet as made clear from the above (vii) a method of inserting the primary global address of the access router to which the network element is attached into the Binding Update message as made clear from the above.

The 20th aspect of the present invention is an apparatus used in a network element which is used in the internetworking of the packet-switched data communications networks as made clear from the above-described method, wherein the network element roams in the internetworking of communications networks, and functions as a bridge router between a single or a plurality of local data communications network of its inner network side interface and the internetworking of the packet-switched data communications networks of its outer network side interface comprising means for realizing the following methods: (i) a method of adding information on the primary global address of the network element to an advertisement message as made clear from the above (ii) a method of using the Binding Entries as made clear from the above (iii) a method of updating the Binding Entries as made clear from the above (iv) a method of inserting instructions into a Binding Acknowledgement message, and thereby making it possible to notify the recipient of the Binding Acknowledgement message that the sender is able to understand and take an appropriate action to have the Binding Update message contain the primary global address of the access router with the presence of such instructions as made clear from the above (v) a method of checking the source address of a data packet as made clear from the above (vi) a method of constructing a routing header as made clear from the above (vii) a method of inserting into a data packet a signal requesting the access router to which the network element is attached to forward the data packet directly to a destination specified in the data packet as made clear from the above (viii) a method of inserting the primary global address of the access router to which the network element is attached into the Binding Update message as made clear from the above (ix) a method of processing a data packet arriving from the inner network side interface of the network element and forwarding it to the outer network side interface of the network as made clear from the above.

The present invention allows a host in internetworking of packet-switched data networks to resort to existing solutions which provide a global connectivity to a mobile host, and extends these solutions to further provide a global connectivity to a network changing its point of attachment. Using a method disclosed in the document herein, it is possible to deliver packets between mobile networks to their intended destinations with the minimum delay, and moreover, adopting a verification method presented by the present invention makes it further possible to alleviate a security threat which a network element is exposed to.

This specification is based on the Japanese Patent Application No. 2002-303879 filed on Oct. 18, 2002, entire content of which is expressly incorporated by reference herein.

INDUSTRIAL APPLICABILITY

The present invention is applicable to packet transmission in internetworking of packet-switched data communications network. Especially, the disclosed invention addresses a problem involved when providing network connectivity to a node which constantly changes its point of attachment to a global data communications network. Furthermore, it is possible to consider the present invention as an enhancement to existing solutions for providing a global connectivity to a roaming host.

What is claimed is:

1. An intermediate router apparatus which provides access to a global network for a single or plurality of network element apparatuses, the intermediate router apparatus comprising:
   an advertising section that includes a unique global address of the intermediate router apparatus in an advertisement message that is transmitted to the single or plurality of network element apparatuses;
   a generating section that generates a binding update message which contains the unique global address of the intermediate router apparatus; and
   an optimal forwarding establishing section that receives packets transmitted by the said single or plurality of network element apparatuses, wherein if the received packets are marked to indicate a request for a more optimal forwarding path, the optimal forwarding establishing section sends the binding update message generated by the generating section to establish an optimal forwarding path, if an optimal path for a destination specified in the received packets is not established, wherein
   if the received packets are marked to indicate a request for a more optimal forwarding path, the intermediate router apparatus transmits the received packets through the optimal path if the optimal path for the destination specified in the received packets is established.

2. The intermediate router apparatus of claim 1, further comprising an address modifying section which modifies a source address of the received packets to the unique global address of the intermediate router apparatus before transmitting the received packets through the optimal path.

3. The intermediate router apparatus of claim 1, to which a temporary global address is assigned, wherein the intermediate router's generating section generates the binding update message to include the unique global address and the temporary global address of the intermediate router apparatus.

4. The intermediate router apparatus of claim 3, which is connected to a single higher level router and makes a roaming connection to an access network contained in the global network, the intermediate router apparatus further comprising:
   an access section that gains access to said access network, to which the roaming connection exists, by using a temporarily assigned global address assigned by this access network; and
   a receiving section that receives an advertisement containing a global address of the higher level router to which the intermediate router apparatus is connected, wherein
   the intermediate router's generating section generates the binding update message to include the temporarily assigned global address and a global address of the higher level router to which the intermediate router apparatus is connected.

5. A communication method for an intermediate router which provides access to a global network for a network element, the method comprising:
   providing, by the intermediate router, access to the global network for the network element;
   advertising, by the intermediate router, a unique global address of the intermediate router in an advertisement message transmitted to the network element;
   generating, by the intermediate router, a binding update message that includes the unique global address; and
   receiving, by the intermediate router, a packet transmitted by the network element, wherein:
      if the received packet indicates a request for a more optimal forwarding path, the intermediate router communicates its generated binding update message for the purpose of establishing a more optimal forwarding path and transmits the received packet through the established, more optimal forwarding path.

6. The method of claim 5, further comprising changing a source address of the received packet to the unique global address before transmitting the received packet.

7. The method of claim 5, further comprising:
   assigning a temporary global address to the intermediate router, wherein
   the binding update message generated by the intermediate router includes the temporary global address.

8. The method of claim 7, further comprising:
   connecting the intermediate router to a higher level router;
   establishing, by the intermediate router, a roaming connection to an access network within the global network;
   accessing, by the intermediate router, the access network, to which the roaming connection is established, using a temporarily assigned global address assigned by this access network; and
   receiving, by the intermediate router, an advertisement including a global address of the higher level router to which the intermediate router apparatus is connected, wherein
   the binding update message generated by the intermediate router includes the temporarily assigned global address and a global address of the higher level router to which the intermediate router is connected.

* * * * *

UNITED STATES PATENT AND TRADEMARK OFFICE
CERTIFICATE OF CORRECTION

PATENT NO. : 8,064,430 B2
APPLICATION NO. : 12/368860
DATED : November 22, 2011
INVENTOR(S) : Chan-Wah Ng et al.

It is certified that error appears in the above-identified patent and that said Letters Patent is hereby corrected as shown below:

ON THE TITLE PAGE:

Item 56, References Cited, Other Publications, page 2, left column, line 18, incorrectly reads:

"draft-ietf-mobileip-lpv618.txt, Work in Progress, 1 page total, Feb."

and should read:

"draft-ietf-mobileip-ipv618.txt, Work in Progress, 1 page total, Feb."

Item 56, References Cited, Other Publications, page 2, left column, line 26, incorrectly reads:

"T. Kniventon, et al., "Mobile Router Tunneling Protocol," Internet"

and should read:

"T. Kniveton, et al., "Mobile Router Tunneling Protocol," Internet"

Item 56, References Cited, Other Publications, page 2, left column, line 27, incorrectly reads:

"Draft: draft-kniventon-mobrtr-03.txt, Work in Progress, pp. 1-17,"

and should read:

Signed and Sealed this
Twenty-second Day of May, 2012

David J. Kappos
*Director of the United States Patent and Trademark Office*

CERTIFICATE OF CORRECTION (continued)
U.S. Pat. No. 8,064,430 B2

"Draft: draft-kniveton-mobrtr-03.txt, Work in Progress, pp. 1-17,"

Item 56, References Cited, Other Publications, page 2, right column, line 2, incorrectly reads:

"ity with the MR-HA Bidirectional Tunnel(MRHA)," Internet-Draft:"

and should read:

"ity with the MR-HA Bidirectional Tunnel (MRHA)," Internet-Draft:"

IN THE CLAIMS:

Claim 1, column 22, line 49, incorrectly reads:

"packets transmitted by the said single or plurality of"

and should read:

"packets transmitted by the single or plurality of"

Claim 8, column 24, line 25, incorrectly reads:

"which the intermediate router apparatus is connected,"

and should read:

"which the intermediate router is connected,"